(12) United States Patent
Kuo

(10) Patent No.: US 7,001,048 B2
(45) Date of Patent: Feb. 21, 2006

(54) REFLECTION-DIFFUSION STRUCTURE ADOPTED FOR A LIGHT GUIDE PLATE

(76) Inventor: Heng Sheng Kuo, P.O. Box 26-757, Taipei (TW) 106

( * ) Notice: Subject to any disclaimer, the term of this patent is extended or adjusted under 35 U.S.C. 154(b) by 138 days.

(21) Appl. No.: 10/736,030

(22) Filed: Dec. 11, 2003

(65) Prior Publication Data

US 2005/0128753 A1    Jun. 16, 2005

(51) Int. Cl.
*F21V 7/18*   (2006.01)

(52) U.S. Cl. ............... 362/301; 362/609; 362/632; 362/346

(58) Field of Classification Search ........... 362/301, 362/609, 632, 633, 634, 346; 349/67
See application file for complete search history.

(56) References Cited

U.S. PATENT DOCUMENTS

| 4,017,155 | A  | * | 4/1977 | Yagi et al. ............... 349/67 |
| 5,040,098 | A  | * | 8/1991 | Tanaka et al. ........... 362/634 |
| 5,207,493 | A  | * | 5/1993 | Murase et al. ........... 362/623 |
| 6,254,244 | B1 | * | 7/2001 | Ukai et al. ............... 349/67 |
| 6,935,766 | B1 | * | 8/2005 | Ato ....................... 362/633 |
| 2005/0018416 | A1 | * | 1/2005 | Amaya ................... 362/31 |
| 2005/0157517 | A1 | * | 7/2005 | Nomura .................. 362/603 |

\* cited by examiner

*Primary Examiner*—Alan Cariaso
(74) *Attorney, Agent, or Firm*—Rosenberg, Klein & Lee

(57) ABSTRACT

A reflection-diffusion structure adopted for a light guide plate has a left wall, a right wall, and a bottom wall, which all are made of reflection materials. A top wall connects to the bottom wall, the left wall and the right wall, and a receiving cavity is formed by the left wall, the right wall, the top wall and the bottom wall. The top wall has a size-adjustable diffusion area made of a diffusion material. The left wall, the right wall, the top wall and the bottom wall are made integrally in one piece. The reflection material and the diffusion material are made integrally in one piece.

9 Claims, 5 Drawing Sheets

REFLECTION-DIFFUSION STRUCTURE ADOPTED FOR A LIGHT GUIDE PLATE

BACKGROUND OF THE INVENTION

1. Field of the Invention

The present invention relates to a reflection-diffusion structure adopted for a light guide plate, and particularly relates to a reflection-diffusion structure adopted for a light guide plate made integrally in one piece.

2. Background of the Invention

Since the quality of LCD improves daily, the price thereof accordingly falls and the fields application for the LCD have rapidly increased to include devices such as a calculator, a monitor, a navigation system, a scanner, a panel of a cell phone, or a notebook. A backlight module of the LCD plays an important role because of the monopolizing power of 75% above and costs of 3% to 5%; accordingly, high uniformity, high luminance, low price, low power consumption, simple structure, thinness and light weight of the backlight module have become important problems for the industry.

The backlight module conventionally includes a light guide plate, a light, a diffuser, and a reflector. The diffuser and the reflector are respectively adhered onto the light guide plate to serve as a conventional reflection-diffusion structure. Referring to FIG. 1, the conventional reflection-diffusion structure adopted for a conventional light guide plate 10 includes a light 14a, a reflector 12a and a diffuser 13a. The light 14a is installed on the conventional light guide plate 10, the reflector 12a is installed under the conventional light guide plate 10, and the diffuser 13a is installed over the conventional light guide plate 10. A conventional method adopted for the diffuser 13a and the reflector 12a respectively adhered onto the conventional light guide plate 10 includes providing four sticks 111a and 112a respectively adhered onto four sides of an upper and a lower surfaces of the conventional light guide plate 10, adhering the reflector 12a onto the four sticks 111a of the lower surface of the conventional light guide plate 10, folding four folds of the reflector 12a respectively adhered onto the four sticks 112a of the upper surface of the conventional light guide plate 10, and then applying another four sticks 113a onto the four folds of the reflector 12a for contacting the diffuser 13a. This method requires at least three layers of sticks and increases a thickness of the backlight module and the number of manufacturing steps. Further, an effective visible area is formed thereon and the effective visible area may be covered by the four sticks on four sides thereof and be diminished. If the effective visible area needs to be enlarged, sides of the reflector 12a, the diffuser 13a and the conventional light guide plate 10, respectively, must be increased, which is more expensive. If the sticks increase in width, more and more light is retained and illumination efficiency is accordingly lessened. Hence, an improvement over the prior art is required to overcome the disadvantages thereof.

SUMMARY OF INVENTION

The primary object of the invention is therefore to specify a reflection-diffusion structure adopted for an integral, one-piece light guide plate, making manufacturing thereof easier and cheaper.

The secondary object of the invention is therefore to specify a reflection-diffusion structure adopted for an integral, one-piece light guide plate that is thin and light-weight.

According to the invention, this object is achieved by a reflection-diffusion structure adopted for a light guide plate including a left wall, a right wall, and a bottom wall, all made of reflection materials, a top wall connecting the bottom wall, the left wall and the right wall, and a receiving cavity formed by the left wall, the right wall, the top wall and the bottom wall. Then top wall includes a size-adjustable diffusion area made of a diffusion material. The left wall, the right wall, the top wall and the bottom wall are made integrally in one piece. The reflection material and the diffusion material are also made integrally in one piece.

To provide a further understanding of the invention, the following detailed description illustrates embodiments and examples of the invention. Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

These and other features, aspects, and advantages of the present invention will become better understood with regard to the following description, appended claims, and accompanying drawings where:

DETAILED DESCRIPTION OF THE EMBODIMENTS

Figure 1:
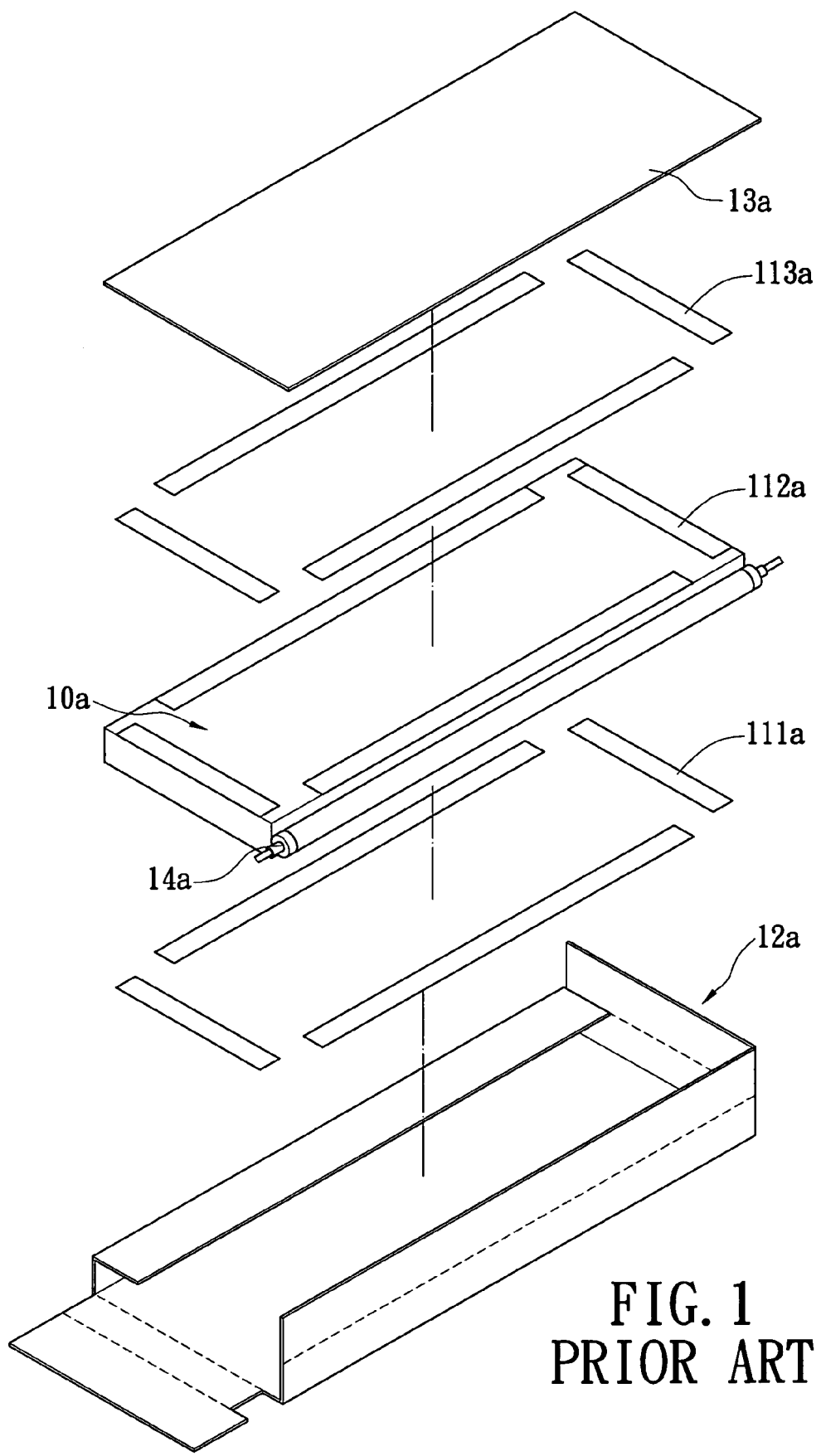
FIG. 1 is a perspective of a conventional light guide plate.
Figure 2:
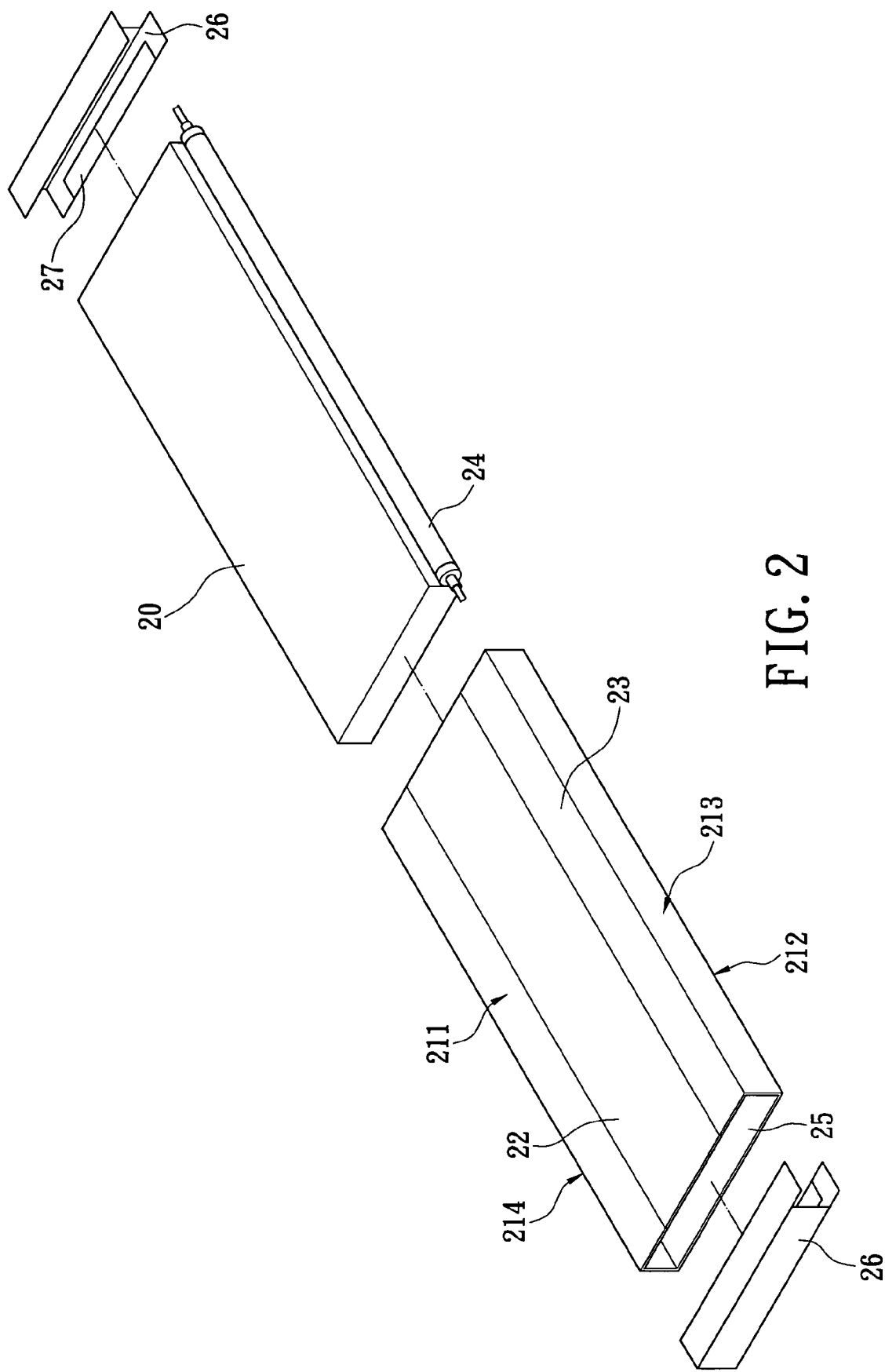
FIG. 2 is a perspective view according to a first embodiment of the present invention reflection-diffusion structure.

With respect to FIG. 2, the present invention provides a reflection-diffusion structure adopted for a light guide plate 20 and a light 24, in which the light 24 is a CCFL (Cold Cathode Fluorescent Lamp), an EL (Electro Luminescence), an LED (Liquid Crystal Display), or a OLED (Organic Liquid Crystal Display). The reflection-diffusion structure includes a left wall 214 made of a first reflection material, a right wall 213 relating to the left wall 214 and made of a second reflection material, a bottom wall 212 connecting the left wall 214 and the right wall 213 and made of a third reflection material, and a top wall 211 relating to the bottom wall 212 and connecting the left wall 214 and the right wall 213. The reflection-diffusion structure further includes a receiving cavity 25 formed by the left wall 214, the right wall 213, the top wall 211 and the bottom wall 212 for receiving the light guide plate 20 and a light 24. The top wall 211 includes a size-adjustable diffusion area 22 made of a diffusion material and a size adjustable reflection area 23, made of a fourth reflection material, and mating with the diffusion area 22 for modifying a size of the diffusion area 22. The diffusion area 22 therefore occupies less than 100% of the top wall 211.

The left wall 214, the right wall 213, the top wall 211 and the bottom wall 212 are made integrally in one piece, and the fourth reflection material, the first reflection material, the second reflection material, the third reflection material and the diffusion material are made integrally in one piece by injection molding. The first reflection material, the second reflection material, the third reflection material, the fourth reflection material and the diffusion material are made from plastic materials. The first reflection material, the second reflection material, the third reflection material, and the fourth reflection material are made of opaque materials, and the diffusion material is transparent and has a matte-finished face.

Figure 3:
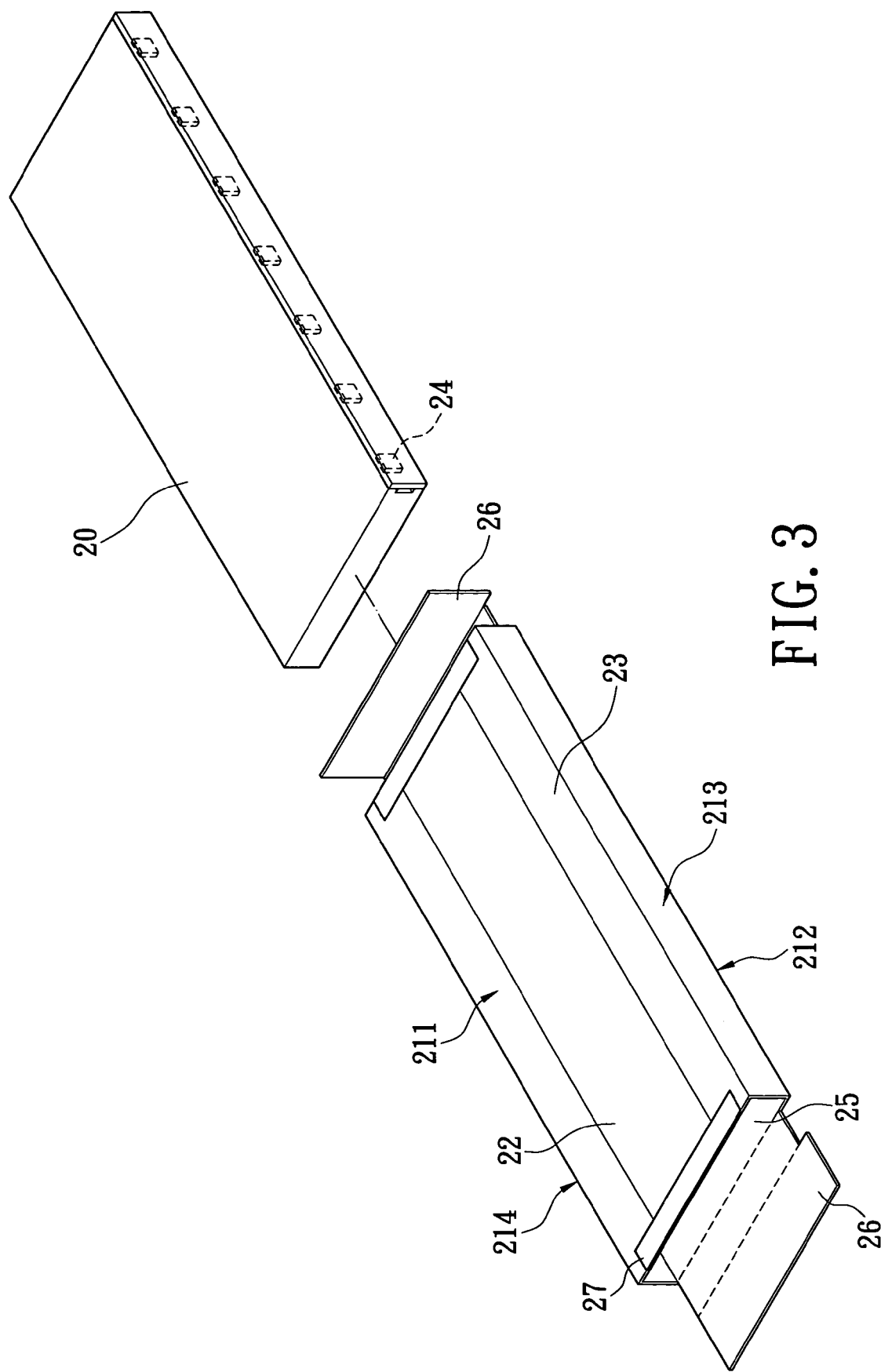
FIG. 3 is a perspective view according to a second embodiment of the present invention reflection-diffusion structure.

The reflection-diffusion structure further includes two reflection members 26 disposed on two opposing ends of each of the left wall 214, the right wall 213, the top wall 211 and the bottom wall 212 to wrap completely the light guide plate 20 therein. Referring to FIG. 3, a second embodiment of the present invention, the present further includes the two reflection members 26 respectively extending from the opposing ends of the bottom wall 212, and folding upwardly to connect the top wall 211 with four sticks 27. A third embodiment of the present invention, the left wall 214, the right wall 213, the top wall 211 and the bottom wall 212 are made integrally in one piece in a sheet shape.

Figure 4:
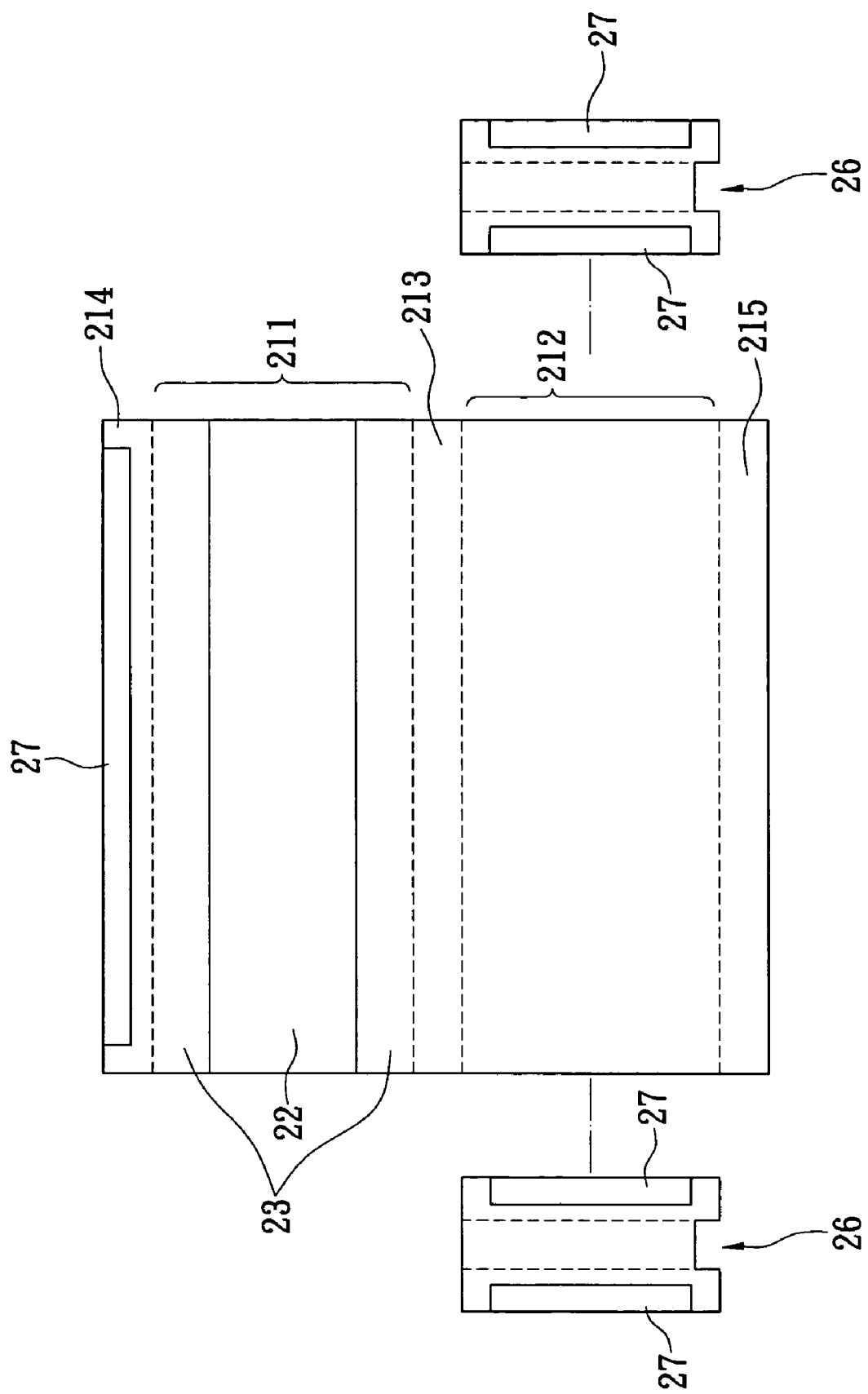
FIG. 4 is a perspective view according to a third embodiment of the present invention reflection-diffusion structure.

The reflection-diffusion structure further includes a overlapping piece 215 connecting to the top wall 211 or the bottom wall 212 for overlapping and connecting the right wall 213 or the left wall 214. The overlapping piece 215 is made of a fifth reflection material. The two reflection members 26 are disposed on two opposing ends of each of the left wall 214, the right wall 213, the top wall 211 and the bottom wall 212, and in particular, as illustrated in FIG. 4, the overlapping piece 215 connecting the bottom wall 212 for overlapping and connecting the left wall 214.

Figure 5:
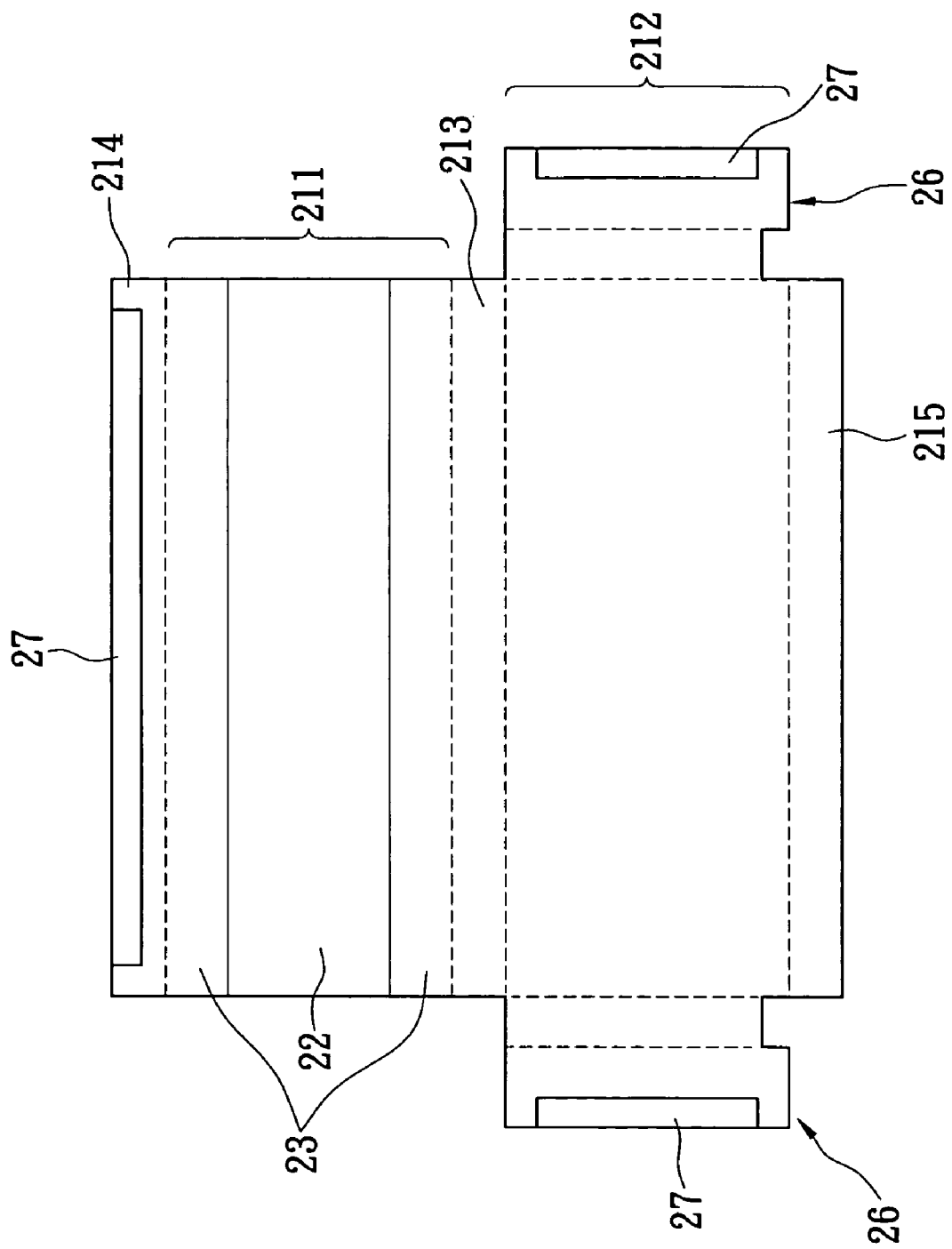
FIG. 5 is a perspective view according to a fourth embodiment of the present invention reflection-diffusion structure.

Referring to FIG. 5, which illustrates a fourth embodiment of the present invention, the receiving cavity 25 is formed by the left wall 214, the right wall 213, the top wall 211 and the bottom wall 212, which all are folded into a hollow box. The two reflection members 26 respectively extend from the opposing ends of the bottom wall 212, and fold upwardly to connect the top wall 211 with the four sticks 27.

Accordingly, the present invention uses fewer sticks to provide a simple structure and easy manufacturing, and the thickness of the backlight module is decreased. The present invention prevents light retention due to the sticks covering four sides of the top wall 211, and luminance will be raised by 3% by removing a layer of sticks.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A reflection-diffusion structure adopted for a light guide plate, comprising:
    a foldable single piece member having first, second, third and fourth portions thereof, each said portion having a pair of opposing first and second sides and a pair of opposing first and second edges, said second portion being integrally connected by the first side thereof to the second side of said first portion, said third portion being integrally connected by the first side thereof to the second side of said second portion, and said fourth portion being integrally connected by the first side thereof to the second side of said third portion,
    said foldable single piece member being folded along said opposing first and second sides with the first side of said first portion connected to the second side of said fourth portion to form a box-like structure, wherein
    a left wall of said box-like structure coincides with said fourth portion, said left wall being made of a first reflection material,
    a right wall of said box-like structure coincides with said second portion, said right wall being made of a second reflection material,
    a bottom wall of said box-like structure coincides with said first portion and connects the left wall and the right wall, said bottom wall being made of a third reflection material, and
    a top wall of said box-like structure coincides with said third portion and connects the left wall and the right wall, the top wall including a size-adjustable diffusion area made of a diffusion material;
    a receiving cavity being formed in said box-like structure by the left wall, the right wall, the top wall and the bottom wall for receiving the light guide plate and a light therewithin; and
    wherein the left wall, the right wall, the top wall and the bottom wall are connected integrally in a single piece, and wherein the first reflection material, the second reflection material, the third reflection material and the diffusion material are connected integrally in a single piece.

2. The reflection-diffusion structure claimed as claim 1, wherein the first reflection material, the second reflection material, the third reflection material and the diffusion material are formed by injection molding.

3. The reflection-diffusion structure claimed as claim 1, wherein the top wall includes a size-adjustable reflection area made of a fourth reflection material, said size-adjustable reflection area cooperating with the diffusion area for modifying a size of the diffusion area, and wherein the fourth reflection material, the first reflection material, the second reflection material, the third reflection material and the diffusion material are connected integrally in a single piece.

4. The reflection-diffusion structure claimed as claim 3, wherein the first reflection material, the second reflection material, the third reflection material, the fourth reflection material and the diffusion material are made from plastic materials.

5. The reflection-diffusion structure claimed as claim 3, wherein the first reflection material, the second reflection material, the third reflection material, and the fourth reflection material are made of opaque materials.

6. The reflection-diffusion structure claimed as claim 1, wherein the diffusion material is made of a transparent material and has a matte-finished face.

7. The reflection-diffusion structure claimed as claim 1, further including an overlapping piece integrally connected to the top wall or the bottom wall for overlapping and connecting to a respective one of the right wall or the left wall, thereby forming the receiving cavity, wherein the overlapping piece is made of a reflection material.

8. The reflection-diffusion structure claimed as claim 1, further including two reflection members disposed on two opposing edges of the left wall, the right wall, the top wall and the bottom wall, respectively, to wrap completely the light guide plate received in said receiving cavity of said box-like structure.

9. The reflection-diffusion structure claimed as claim 1, further including two reflection members respectively extending at opposing edges of the bottom wall and integrally connected thereto, said reflection members folding upwardly to connect to the top wall.

* * * * *